US005147496A

United States Patent [19]

Hix

[11] Patent Number: 5,147,496

[45] Date of Patent: Sep. 15, 1992

[54] LINKAGE FOR HEAT TRANSFER MACHINE

[75] Inventor: Clifford A. Hix, Pittsburg, Kans.

[73] Assignee: Hix Corporation, Pittsburg, Kans.

[21] Appl. No.: 665,381

[22] Filed: Mar. 6, 1991

[51] Int. Cl.[5] .............................................. B32B 31/00

[52] U.S. Cl. ................................. 156/583.8; 156/579; 156/583.1; 100/283

[58] Field of Search ............... 156/583.8, 583.9, 583.1, 156/579; 100/233, 283, 293, 93 P, 902

[56] References Cited

U.S. PATENT DOCUMENTS

| | | | |
|---|---|---|---|
| 2,624,389 | 1/1953 | Bungay | 156/583.9 X |
| 2,644,151 | 6/1953 | Krueger | 156/583.9 X |
| 3,450,031 | 6/1969 | Peterson | 100/93 P |
| 4,190,485 | 2/1980 | Takeda et al. | 156/583.9 |

*Primary Examiner*—David A. Simmons
*Assistant Examiner*—J. Sells
*Attorney, Agent, or Firm*—Kokjer, Kircher, Bowman & Johnson

[57] ABSTRACT

A heat transfer machine is provided with upper and lower platens and a compound linkage which permits one motion opening and closing as well as application of a large compression force to the platens. The linkage automatically toggles between a primary linkage configuration and a secondary linkage configuration upon movement of a lever arm by the machine operator. The primary linkage configuration allows the upper platen to be opened and closed while the secondary linkage configuration permits application of the compressive force to the platens.

5 Claims, 3 Drawing Sheets

LINKAGE FOR HEAT TRANSFER MACHINE

BACKGROUND OF THE INVENTION

This invention relates generally to heat transfer machines and, more particularly, to an improved linkage for a platen type press useful for applying decals onto articles such as clothing.

Heat transfer machines are widely utilized to apply premanufactured decals or "transfers" onto numerous articles and substrates such as sweatshirts, t-shirts, papers and plastics. Such machines are typically clamshell type presses with upper and lower platens which are brought into registry and compressed for a preselected period of time to apply the transfer to the article which is positioned on the lower platen. The upper and/or lower platen is typically heated to facilitate bonding of the transfer with the substrate. After the transfer has been applied, the press is opened by upward pivoting of the upper platen to permit removal of the clothing with the transfer applied thereto. Another clothing article and transfer may then be placed on the lower platen and the upper platen lowered to apply the transfer to the clothing.

When operating heat transfer machines of the type described above, it is important that adequate pressure be applied to the platens to ensure proper adherence of the transfer to the clothing. It is also desirable to be able to lock the upper platen into compression against the lower platen to provide a uniform pressure during the time period required to apply the transfer to the substrate. Linkages such as a type known as a four-bar linkage are commonly used to achieve the desired pressure and locking action. The upper platen is mounted to one bar of the linkage and another bar serves as a lever arm which is manipulated by the machine operator. The force applied by the operator on the lever arm is amplified by the linkage so that a greater force is applied to the upper platen than could otherwise be exerted by the operator. In addition, when the upper platen is fully compressed against the lower platen, a slight overclosure of the linkage provides a locking action which maintains the platens in compression. The locking action of the linkage may be readily overcome by the operator lifting upward on the lever arm to open the press after the transfer has been applied to the article in the press.

Because of the repetitive nature of the transfer application process, it is important that the machine operator be able to remain stationed in front of the machine while moving the lever arm between the fully opened and closed position. This requirement restricts the range of movement of the lever arm and the force that may be effectively applied with linkages of the type described above. The force which may be supplied by such linkages is further restricted by the need for the upper platen to have a large travel path so that the transfer article may be placed by the operator on the lower platen with less risk of the operator accidentally burning his hands on the hot undersurface of the upper platen. In order to achieve the desired opening of the upper platen, a substantial portion of the lever arm range of motion must be dedicated to pivoting movement of the upper platen. Only a small portion of the lever arm travel then remains for compression of the platens.

With the advent of new types of transfers and processes such as embossing which require large pressures for effective application and the desire for larger platen sizes, a need has developed for platen presses capable of delivering greater compression forces. Some platen presses are now available with a pneumatic closing mechanism which supplies increased pressure by using a cylinder or diaphragm to compress the platens. The pneumatic closing device, however, may be hazardous if improperly designed or used. Such devices also significantly increase the cost of the press and a source of compressed air is necessary to operate the closing device.

Other attempts to supply the necessary platen travel and compression force have focused on sideways swinging of the upper platen after compression between the platens has been released. Such an arrangement often requires manipulation of two handles and is more difficult for the operator to manage in comparison to the simple one-motion closing and pressurization provided by the linkage previously described. A need thus remains for a linkage which is operable in a single motion to provide a large range of platen travel and the large compression forces required by current transfer materials and techniques.

SUMMARY OF THE INVENTION

It is an object of this invention to provide a platen-type press with a linkage which exerts a greater force on the upper platen than conventional linkages so that the press may be used to apply even those transfers requiring large compression forces to articles such as clothing.

It is also an object of this invention to provide a platen-type press with a linkage which greatly amplifies the force applied by the press operator and which may be manipulated in a single motion to both close and apply the amplified force to the platens so that the press may be efficiently operated with limited operator movement.

It is another object of this invention to provide a platen-type press with a linkage which, in addition to greatly amplifying the force applied thereto, also locks into a closed position so that a uniform pressure is maintained on a transfer and article by the platens for the length of time required for bonding of the transfer to the article.

It is a further object of this invention to provide a platen-type press with a linkage which greatly amplifies the force applied thereto and which utilizes a lever arm which is within reach of the press operator even when the platens are fully opened so that the operator may remain in a fix position during operation of the press.

It is yet another object of this invention to provide a platen-type press with a linkage having a lever arm which has a large range of travel for compression of the platens so that a force applied to the lever arm is greatly amplified by the linkage, but which lever arm also has a large range of travel devoted to opening and closing of the platens to facilitate loading and unloading of the substrate and to reduce the opportunity for the press operator to inadvertently contact the hot inner surfaces of the platens.

To accomplish these and other related objects of the invention, a platen-type press is provided with a linkage having:

a lever arm;

a primary pivot axis;

a secondary pivot axis; and a stop for moving the linkage between a primary linkage configuration pivoting about said primary pivot axis and a secondary linkage configuration pivoting about said secondary pivot axis in response to movement of the lever arm, said secondary linkage configuration having a higher linkage ratio than the linkage ratio of said primary linkage to cause greater amplification of a force applied to the lever arm of said linkage. The linkage automatically toggles between the primary and secondary linkage configurations as the lever arm is moved through its range of travel.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENT

Figure 2:
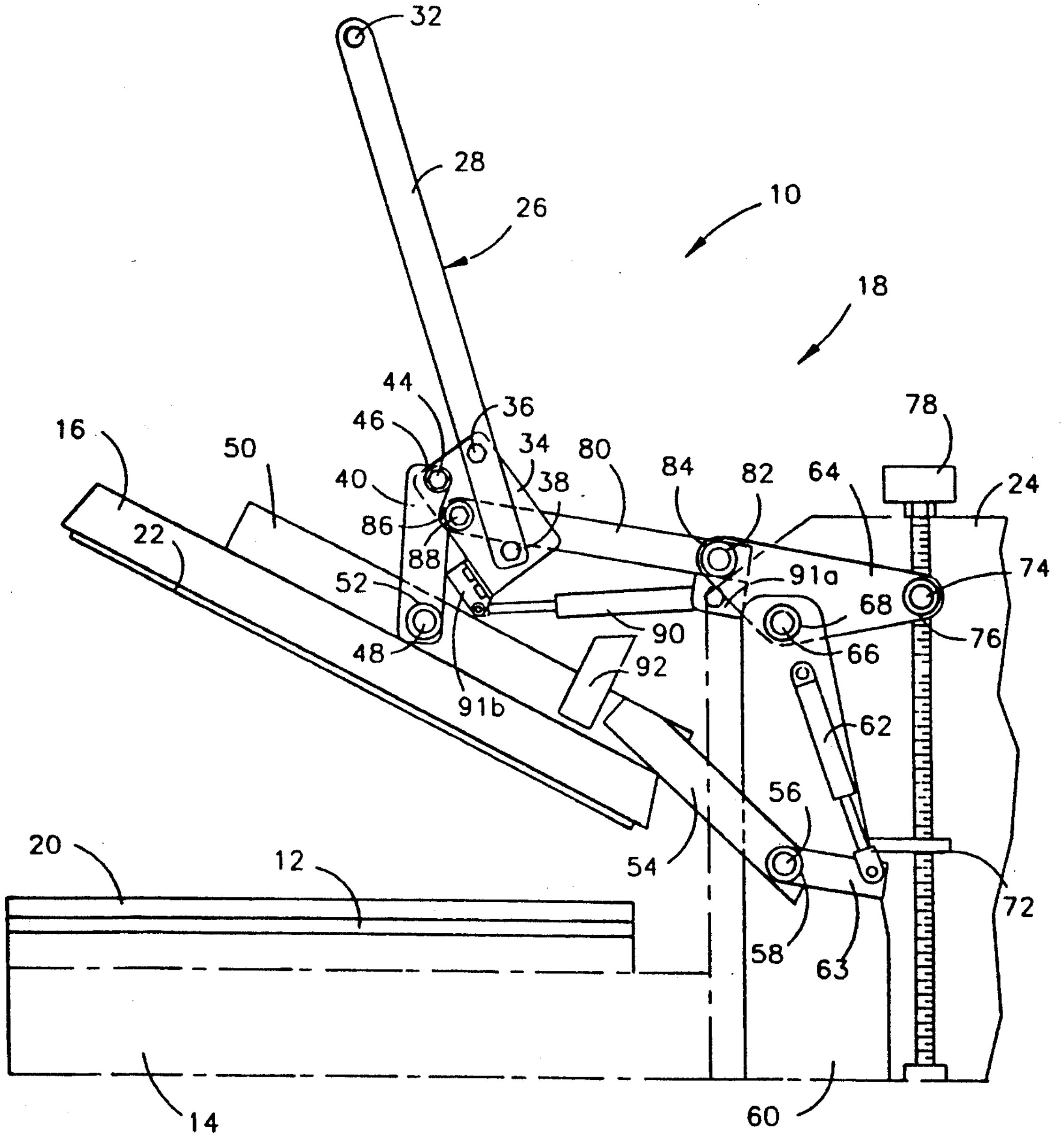
FIG. 2 is a side elevational view of the heat transfer machine shown in FIG. 1 also shown in a fully opened position with the linkage positioned in a primary linkage configuration and with portions of the machine being shown in broken lines to illustrate internal components of the machine.
Figure 4:
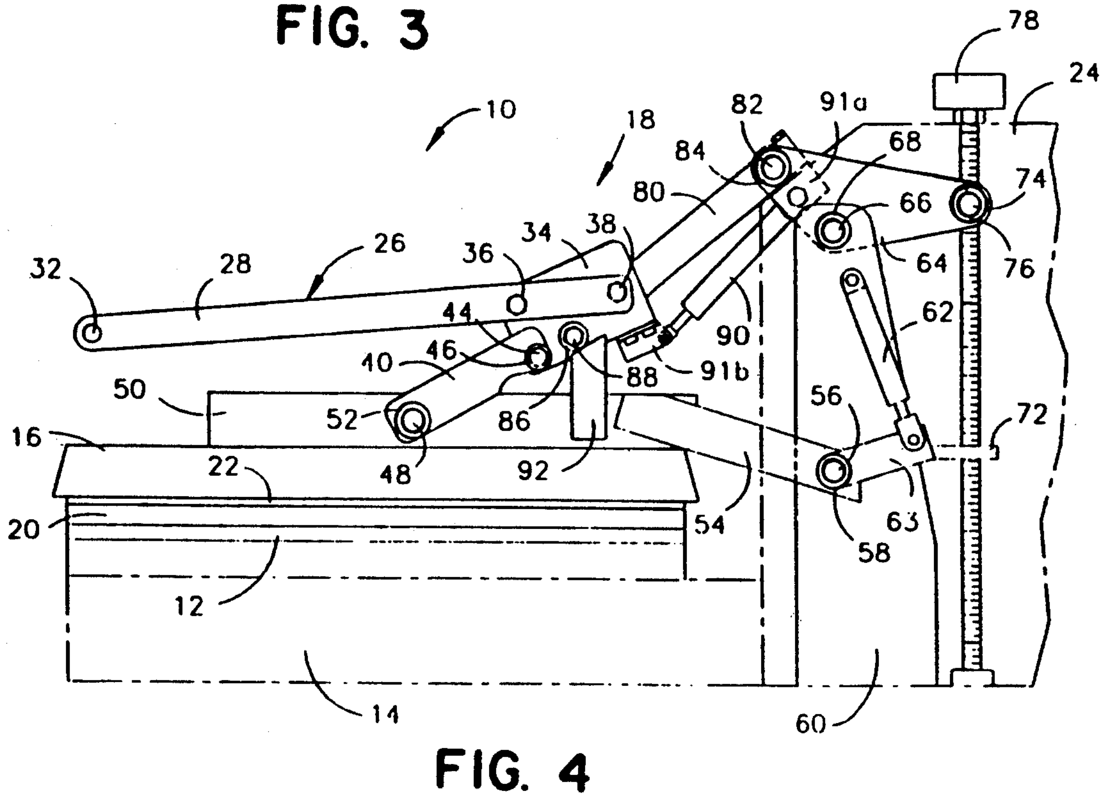
FIG. 4 is a side elevational view of the heat transfer machine similar to the views shown in FIGS. 2 and 3 but with the linkage and upper platen moved to a fully closed position with the linkage in the secondary linkage configuration and overclosed to lock the linkage in a mode supplying a large compression force to the platens.

Referring now to the drawings in greater detail, the numeral 10 broadly designates a platen-type press useful as a heat transfer machine for applying transfers to articles such as clothing. Press 10 includes a lower platen 12 mounted to a suitable base 14 such as by a quick release mechanism, and an upper platen 16 which is coupled with a linkage 18 for movement between an open position as shown in FIG. 2 and a closed compression position as shown in FIG. 4. Both platens 12 and 16 have inner liners 20 and 22, respectively, and either or both platens may include suitable heating elements (not shown). Preferably at least the upper platen has such heating elements. Press 10 also includes a housing 24 on and within which the timing, heating and other necessary controls may be maintained.

Linkage 18 includes a lever arm 26 having spaced apart links 28 and 30. A handle 32 extends between the links at one end of lever arm 26 while the other end portions of links 28 and 30 extend along opposite sides of and are coupled with a toggle box 34 by bolts 36 and 38. Forward bolt 36 extends through both links and the toggle box 34. Rearwardly positioned bolt 38 secures link 28 to the toggle box but does not extend through the toggle box. Instead, another bolt (not shown) is provided on the other side of toggle box 34 to secure link 30 to the toggle box in the same manner as bolt 38 secures link 28 to the box. The bolts 36 and 38 serve to hold the lever arm 26 to toggle box 34 in a fixed relationship to prevent relative movement therebetween.

Another set of spaced apart links 40 and 42 are coupled at first ends with toggle box 34 by a bolt or pivot pin 44 which is spaced from bolt 36 at one end of the toggle box. Suitable bushings 46 are provided to permit the links 40 and 42 to rotate about the axis of pivot pin 44. The other ends of links 40 and 42 are secured by a bolt or pivot pin 48 to a tubular member 50 which extends along and is secured to the top surface of upper platen 16. Bushings 52 are likewise provided on pivot pin 48 to permit rotation of links 40 and 42 about the axis of such pin.

Tubular member 50 which is secured to the upper platen 16 includes rearwardly projecting extensions 54 and 55 which are pivotably secured at their ends by pivot pin 56 and bushings 58 to spaced apart fixed uprights 60 and 61 positioned within housing 24. A hydraulically damped, nitrogen gas filled cylinder 62 is pivotably coupled by a short link 63 to the extension 54. The short link 63 is welded or otherwise secured to the extension with pivot pin 56 extending through the link. The other end of cylinder 62 is fixed to upright 61 so that the extension force of the cylinder operates through the connecting links to urge upward movement of the upper platen. Another cylinder (not shown) is likewise positioned on the other upright 61 and extension 55.

Spaced apart triangular-shaped adjustment wedges 64 and 65 are also pivotably mounted on uprights 60 and 61 by a bolt or pivot pin 66 which is spaced above pivot pin 56 and which extends through the inverted apex of both wedges. Bushings 68 are provided on pivot pin 66.

Adjustment wedges 64 and 65 are also pivotably coupled with a vertically extending adjustment screw 70. Screw 70 is threaded through and support by a bracket 72 which extends from uprights 60 and 61. Screw 70 also extends through a threaded boss (not shown) which extends between one end of the base portion of adjustment wedges 64 and 65. Suitable pivot pins 74 and bushings 76 rotatably secure the boss to the wedges 64 and 65. A knob 78 is provided atop screw 70 for adjustment thereof.

The other end of the adjustment wedge 64 and 65 base portion is coupled with toggle box 34 by a primary link 80. The primary link 80 is rotatably coupled with wedges 64 and 65 by a pivot pin 82 and bushings 84. The other end of link 80 extends within the toggle box and is rotatably coupled therewith by a pivot pin 86 and bearings 88 which extend outwardly from the sides of toggle box 34. Bearings 88 may comprises caged needle, spindle roller or other types of bearings capable of withstanding the loads imposed thereon.

One end of a hydraulically damped, nitrogen gas filled cylinder 90 is connected by a suitable mount 91*a* to the end of primary link 80 which is coupled with adjustment wedges 64 and 65. The other end of cylinder 90 is fixed by mount 91*b* to a bottom edge of toggle box 34. The gas pressure within the cylinder acts to extend the cylinder and operates to urge clockwise rotation of toggle box 34 about pivot pin 86 as viewed in the drawings. It is to be understood that cylinders 62 and 90 may be replaced by other suitable devices such as compression or tension springs which may be used without dampening to serve the same purpose as the cylinders.

A pair of spaced apart stops 92 are provided on both sides of the tubular member 50 and extend upward therefrom. The stops 92 are welded or otherwise securely connected to the tubular member and are positioned so that when the lever arm 26 is moved to the intermediate position shown in FIG. 3, an inclined upper edge of both stops contacts the bearings 88 which extend from toggle box 34.

Figure 1:
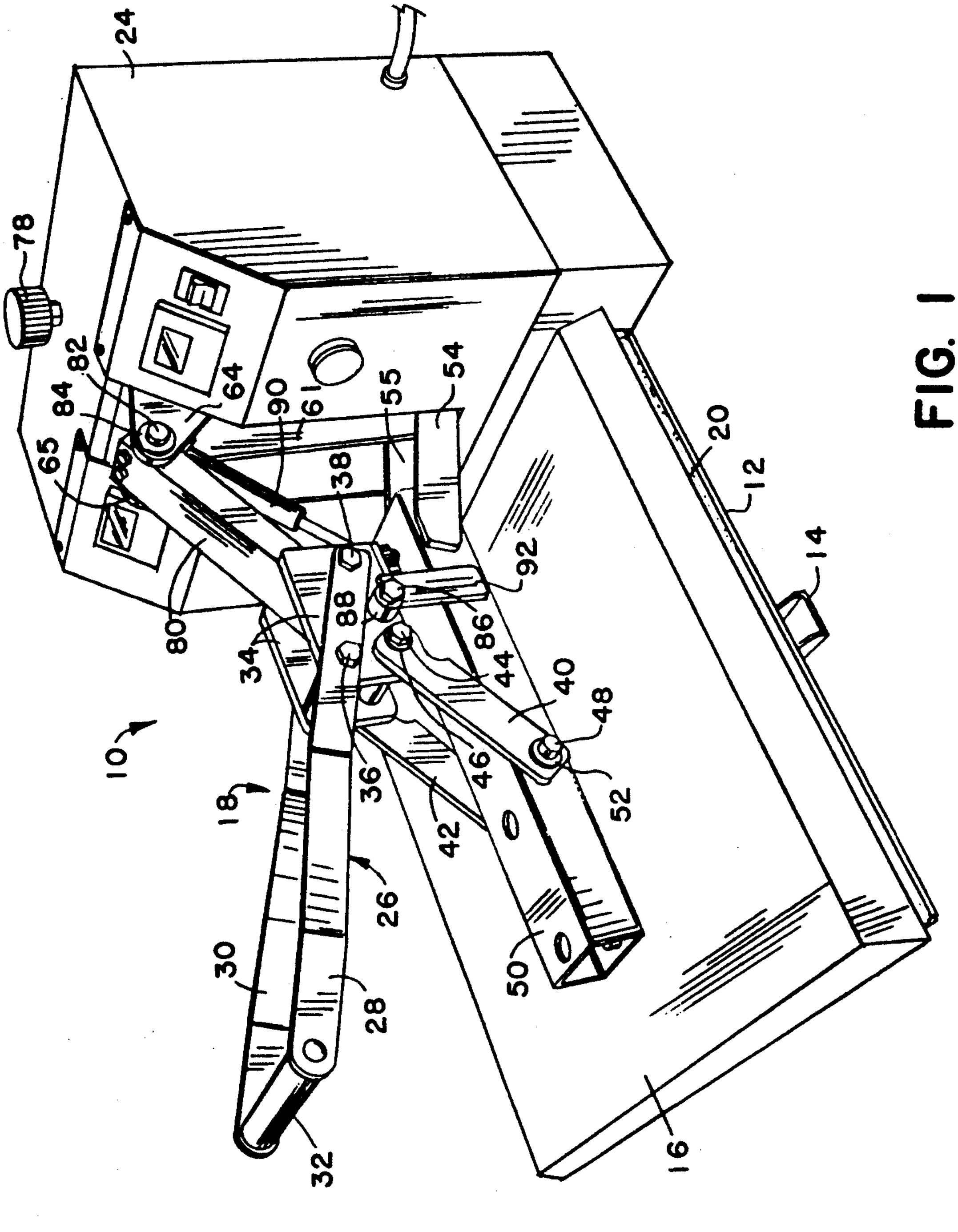
FIG. 1 is a side perspective view of a type of platen press known as a heat transfer machine, which machine employs a linkage made in accordance with the present invention, the linkage and platens being shown in a fully opened configuration and portions of the machine being shown in broken lines to illustrate internal components of the machine.

In use, machine 10 may be operated to apply transfers to articles such as clothing positioned on the lower platen 12. The machine is first placed in the open configuration illustrated in FIG. 1. The article is then positioned on the liner 20 of the lower platen and the transfer is placed in the desired location atop the article. The lever arm handle 32 is then grasped by the machine operator and pulled downwardly to lower the heated upper platen 16 and compress the transfer and the article to which it is being applied between the upper and lower platens. After a preselected period of time, the lever arm is raised to return the machine to the open configuration to permit removal of the article and the applied transfer from the lower platen.

Linkage 18 automatically toggles between a primary linkage configuration and a secondary linkage configuration as the lever arm 26 is moved through its range of travel. In the primary linkage configuration such as illustrated in FIG. 2, the dampening cylinder 90 exerts an extension force on the toggle box to restrict rotation of the lever arm 26 and the attached toggle box 34 about the pivot pin 86. The lever arm 26 and primary linkage 80 are thus rotatable as a single member about a primary pivot axis defined by pivot pin 82. The primary pivot pin is fixed in position and a downward force applied to the lever arm handle 32 is amplified and transmitted to the upper platen 16 through links 40 and 42 which are pivotally coupled with the toggle box 34 by pivot pin 44. The force amplification is a function of the ratio of the distance between handle 32 and primary pivot pin 82 and the distance between the primary pivot pin 82 and pivot pin 44.

Figure 3:
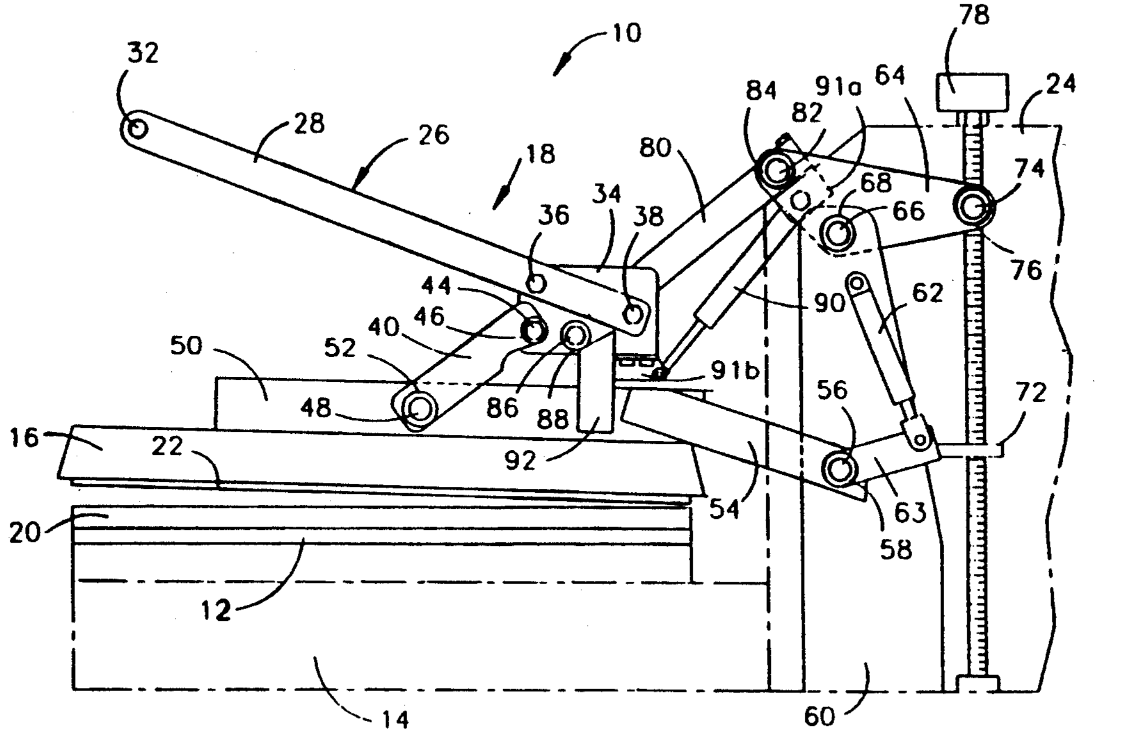
FIG. 3 is a side elevational view of the heat transfer machine similar to the view shown in FIG. 2 but with the linkage and upper platen moved to an intermediate position with a secondary pivot engaged to toggle the linkage to a secondary linkage configuration.

As the lever arm 26 is lowered to the intermediate position illustrated in FIG. 3, the stops 92 contact bearings 88 on pivot pin 86 to automatically toggle the linkage from the primary linkage configuration to a secondary linkage configuration. In the secondary linkage configuration, stops 92 act as fulcrums and continued downward force on the lever arm handle 32 is amplified and overcomes the force provided by dampening cylinder 90 to cause the toggle box 34 to rotate about a secondary pivot axis defined by pivot pin 86. The toggle box rotates only until an internal stop engages the undersurface of primary link 80 and then the amplified force is directed to the links 40 and 42 which couple the toggle box to the upper platen 16.

The force amplification when linkage 18 is in the secondary linkage configuration is a function of the ratio of the distance between the lever arm handle 32 and secondary pivot pin 86 and the distance between the secondary pivot pin and pivot pin 44. This secondary linkage ratio is much larger than the primary linkage ratio and permits a large compression force to be transmitted to the upper platen 16 by movement of the lever arm 26 from the intermediate position shown in FIG. 3 to the closed position shown in FIG. 4. It can also be seen that the lever arm 26 moves through a large distance of travel as it moves between the intermediate and closed positions, while the upper platen 16 moves only a short distance in response to the lever arm movement. Most of the lever arm movement in this arc of travel is thus utilized to compress the upper platen against the lower platen 12 and the machine operator is able to impart a large compression force to the platens.

As is shown in FIG. 4, linkage 1B is easily placed into an overclosed configuration wherein the stress imposed on the linkage components locks the linkage to resist release thereof. In the locking mode, the linkage transmits a uniform compressive force to the platens so that the necessary pressure is maintained for the preselected time period required for application of the transfer to the clothing or other article. The linkage 18 may be readily released from the locking mode by the operator lifting upward on the lever arm handle 32. The cylinders 62 transmit a lifting force on upper platen through the short links 63, extension 54 and 55 and tubular member 50 to assist in lifting of the platen. The other cylinder 90 also acts to urge rotational movement of the lever arm 26 and attached toggle box 34 about pivot pin 86. The substantial portion of the upward movement of the lever arm is thus devoted to release of the upper platen 16 and upward movement thereof so that the necessary separation between the platens is provided while the lever arm handle 32 is easily within the reach of the machine operator.

Adjustment knob 78 and screw 70 permit adjustment of the location of the primary pivot pin 82 so that the force required to place the linkage in the locking configuration of FIG. 4 may be varied as needed. If desired, suitable passages may be provided through toggle box 34 and primary link 80 so that a pin may be inserted therethrough to fix the toggle box and lever 26 to the primary link 80 for use in certain operations. For example, if only light pressure is to be applied by the linkage 18 on the platens, the force exerted by the cylinder 90 may be sufficient to prevent overclosure locking of the linkage. Fixing the toggle box and lever to the primary link in such a situation would prevent opening of the overclosure lock by the extension force of cylinder 90.

It can thus be seen that linkage 18 provides one motion closing of the upper platen 16 onto the lower platen 12 as well as application of a large compression force to the platens. The linkage automatically toggles between the lower ratio primary linkage configuration and the higher ratio secondary linkage configuration when the stops 92 engage bearings 88. A large portion of the arc of travel of the lever arm 26 during downward movement thereof in the secondary linkage configuration is devoted to compression of the platens to achieve the large compression forces required for current transfers and techniques. The toggling action of the linkage also permits a large portion of the upward arc of travel of lever arm 26 to be devoted to upward movement of the upper platen 16 so that the risk of inadvertent contact of the heated upper platen by the operator during placement and removal of the clothing or other article is greatly reduced. Yet, the lever arm remains easily within the reach of the operator throughout its arc of travel so that the operator may remain positioned in front of the machine.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without department from the scope thereof, it is to be understood that all matter herein set forth or shown in the accompanying drawings is to be interpreted as illustrative and not in a limiting sense.

Having thus described the invention, what is claimed is:

1. A platen-type press comprising:

first and second platens; and a linkage coupled with one of said platens, said linkage including a lever arm and primary and secondary pivot axes, said linkage further including a stop for moving the linkage between a primary linkage configuration pivoting about said primary pivot axis and a secondary linkage configuration pivoting about said secondary pivot axis in response to movement of the lever arm, said secondary linkage configuration providing greater amplification of a force applied to the lever arm than the amplification provided by the primary linkage configuration when the force is applied to the lever arm.

2. A platen-type press comprising:

first and second platens;

a linkage coupled with said first platen and including a lever arm operable in response to a closing force applied to the lever arm to move said first platen into registry with said second platen for compression of a substrate between said platens, said lever arm further operable in response to an opening force applied to the lever arm to release said compression and move said first platen away from said second platen, said linkage further including a stop for moving the linkage between a primary linkage configuration and a secondary linkage configuration during movement of the lever arm in response to said closing force, wherein said secondary linkage configuration provides a greater amplification of the closing force than the amplification provided by said primary linkage configuration.

3. The platen-type press of claim 2 wherein said linkage is configured to be movable to an overclosed position during said compression to releasably lock the linkage in said overclosed position.

4. The platen-type press of claim 2, including biasing means coupled with the linkage for exerting a force urging the linkage toward the primary linkage configuration, wherein said biasing means is coupled with the linkage in a manner to maintain said linkage in said primary linkage configuration to prior to engagement of said stop during application of said closing force to the lever arm, wherein said linkage is moved to the secondary linkage configuration as the force applied by the biasing means is overcome following engagement of said stop.

5. The platen-type press of claim 4, including second biasing means coupled with the first platen for exerting a force urging movement of the first platen away from the second platen to assist in releasing said compression between the platens.

* * * * *